United States Patent
Braun et al.

(10) Patent No.: US 11,143,126 B2
(45) Date of Patent: Oct. 12, 2021

(54) MONITORING DEVIATIONS OCCURRING IN THE VALVE DRIVE OF AN INTERNAL COMBUSTION ENGINE, AND ELECTRONIC ENGINE CONTROL UNITS FOR EXECUTING SUCH METHODS

(71) Applicant: CPT Group GmbH, Hannover (DE)

(72) Inventors: Tobias Braun, Undorf (DE); Matthias Delp, Bad Abbach (DE); Frank Maurer, Regenstauf (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 16/461,111

(22) PCT Filed: Oct. 9, 2017

(86) PCT No.: PCT/EP2017/075605
§ 371 (c)(1),
(2) Date: May 15, 2019

(87) PCT Pub. No.: WO2018/091201
PCT Pub. Date: May 24, 2018

(65) Prior Publication Data
US 2020/0063674 A1 Feb. 27, 2020

(30) Foreign Application Priority Data
Nov. 16, 2016 (DE) ...................... 10 2016 222 533.2

(51) Int. Cl.
*F02D 41/00* (2006.01)
*F01L 1/344* (2006.01)
(Continued)

(52) U.S. Cl.
CPC ............ *F02D 41/009* (2013.01); *F01L 1/344* (2013.01); *F02D 13/0219* (2013.01);
(Continued)

(58) Field of Classification Search
None
See application file for complete search history.

(56) References Cited

U.S. PATENT DOCUMENTS 5,495,830 A * 3/1996 Wu .................. F01L 3/205
123/184.47
5,689,067 A 11/1997 Klein et al. ................. 73/114.79
(Continued)

FOREIGN PATENT DOCUMENTS

CN 104165096 A 11/2014 ............. F02D 13/02
DE 195 03 457 C1 7/1996 ................ F01L 1/02
(Continued)

OTHER PUBLICATIONS

German Office Action, Application No. 10 2016 222 533.2, 5 pages, dated Jul. 13, 2017.
(Continued)

*Primary Examiner* — Patrick Hamo
*Assistant Examiner* — Wesley G Harris
(74) *Attorney, Agent, or Firm* — Slayden Grubert Beard PLLC (57) ABSTRACT

Various embodiments include a method for detecting deviations occurring in the valve drive of an internal combustion engine comprising: measuring dynamic pressure oscillations of intake air in an air intake tract of respective internal combustion engine during operation; calculating an inlet valve stroke phase difference and/or an outlet valve stroke phase difference based on the measured dynamic pressure oscillation; calculating a valve stroke phase deviation value with respect to a valve stroke phase reference value based on the calculated phase difference; and calculating a first valve drive deviation value based on the valve stroke phase deviation value.

10 Claims, 4 Drawing Sheets

(51) Int. Cl.
*F02D 13/02* (2006.01)
*F02D 41/22* (2006.01)
*F02D 41/24* (2006.01)
*F02D 41/28* (2006.01)
*F01L 1/053* (2006.01)
*F02D 41/14* (2006.01)

(52) U.S. Cl.
CPC ....... *F02D 41/221* (2013.01); *F02D 41/2432* (2013.01); *F02D 41/2464* (2013.01); *F02D 41/28* (2013.01); *F01L 1/0532* (2013.01); *F01L 2001/0537* (2013.01); *F01L 2001/34496* (2013.01); *F01L 2250/02* (2013.01); *F01L 2250/04* (2013.01); *F01L 2250/06* (2013.01); *F01L 2800/11* (2013.01); *F01L 2800/12* (2013.01); *F01L 2800/14* (2013.01); *F01L 2820/041* (2013.01); *F01L 2820/042* (2013.01); *F02D 2041/1433* (2013.01); *F02D 2041/227* (2013.01); *F02D 2041/228* (2013.01); *F02D 2041/288* (2013.01); *F02D 2200/0406* (2013.01)

(56) References Cited

U.S. PATENT DOCUMENTS

| | | | |
|---|---|---|---|
| 6,804,997 B1* | 10/2004 | Schwulst | F02D 41/009 73/114.26 |
| 7,017,551 B2 | 3/2006 | Shimizu | 123/399 |
| 7,225,793 B2* | 6/2007 | Schwulst | F02D 41/18 123/406.47 |
| 9,109,520 B2 | 8/2015 | Nakagawa et al. | |
| 10,415,494 B2* | 9/2019 | Braun | F02D 41/3005 |
| 2007/0101959 A1 | 5/2007 | Soejima | F01L 1/34 123/90.17 |
| 2008/0236267 A1* | 10/2008 | Hartmann | F02D 41/221 73/114.37 |
| 2009/0139478 A1 | 6/2009 | Dell et al. | 123/90.31 |
| 2010/0083640 A1* | 4/2010 | Wang | F02D 41/1462 60/286 |
| 2011/0167900 A1 | 7/2011 | Zanotti et al. | 73/114.37 |
| 2015/0152792 A1 | 6/2015 | Eser et al. | 123/672 |
| 2016/0090932 A1* | 3/2016 | Fiorini | F01L 1/3442 701/103 |
| 2017/0198649 A1 | 7/2017 | Kainz et al. | |
| 2018/0051598 A1* | 2/2018 | Pedro | F02D 41/2464 |
| 2018/0355815 A1 | 12/2018 | Braun et al. | |
| 2020/0049081 A1 | 2/2020 | Gauerhof et al. | |

FOREIGN PATENT DOCUMENTS

| | | | | |
|---|---|---|---|---|
| DE | 10 2004 041 526 A1 | 3/2006 | ............ | F02D 13/02 |
| DE | 10 2007 013 252 A1 | 9/2008 | ............ | F02D 41/22 |
| DE | 10 2008 028 722 B3 | 2/2010 | ............ | F02D 41/00 |
| DE | 10 2011 088 403 B3 | 1/2013 | ............ | F02D 41/14 |
| DE | 10 2012 212 860 B3 | 12/2013 | ............ | F01M 1/00 |
| DE | 10 2014 203 688 A1 | 9/2015 | ............ | F01L 9/02 |
| DE | 10 2015 209 665 A1 | 12/2015 | ............ | F02D 41/00 |
| DE | 10 2015 200 472 A1 | 7/2016 | ............ | F02D 13/02 |
| DE | 10 2015 222 408 B3 | 3/2017 | ............ | F02D 41/02 |
| DE | 10 2016 219 582 B3 | 6/2017 | ............ | F02D 13/00 |
| DE | 10 2016 219 584 B4 | 5/2018 | ............ | F02D 13/02 |
| EP | 1 915 516 B1 | 4/2014 | ............ | F01L 1/02 |
| FR | 2 850 755 B1 | 5/2005 | ............ | F01L 1/02 |
| JP | 2005264763 A | 9/2005 | ............ | F01L 1/34 |
| JP | 2007154697 A | 6/2007 | ............ | F01L 1/46 |
| KR | 20190057390 A | 5/1919 | ............ | F02D 35/02 |
| KR | 20190057390 A | 5/2019 | | |
| WO | 2012/066666 A1 | 5/2014 | ............ | F01L 1/46 |
| WO | WO 2012/066666 A1 | 5/2014 | | |
| WO | 2018/091201 A1 | 5/2018 | ............ | F01L 13/00 |

OTHER PUBLICATIONS

International Search Report and Written Opinion, Application No. PCT/EP2017/075605, 20 pages, dated Nov. 21, 2017.
Korean Notice of Allowance, Application No. 2020053991577, 4 pages, dated Aug. 16, 2020.
Japanese Office Action, Application No. 2019546977, 3 pages, dated Jun. 9, 2020.
Chinese Office Action, Application No. 201780070988.0, 15 pages, dated Jun. 2, 2021.

* cited by examiner

MONITORING DEVIATIONS OCCURRING IN THE VALVE DRIVE OF AN INTERNAL COMBUSTION ENGINE, AND ELECTRONIC ENGINE CONTROL UNITS FOR EXECUTING SUCH METHODS

CROSS-REFERENCE TO RELATED APPLICATIONS

This application is a U.S. National Stage Application of International Application No. PCT/EP2017/075605 filed Oct. 9, 2017, which designates the United States of America, and claims priority to DE Application No. 10 2016 222 533.2 filed Nov. 16, 2016, the contents of which are hereby incorporated by reference in their entirety.

TECHNICAL FIELD

The present disclosure relates to engines. Various embodiments include methods with which wear phenomena of the valve drive and therefore resulting deviations in the positional accuracy of the valve drive and therefore deviations in the valve control times can be acquired and monitored, and which permits plausibility checking of acquired deviation values and/or electronic engine control units for executing such methods.

BACKGROUND

Reciprocating-piston internal combustion engines, which will hereinafter also be referred to in shortened form merely as internal combustion engines, have one or more cylinders in which in each case one reciprocating piston is arranged. To illustrate the principle of a reciprocating-piston internal combustion engine, reference will be made below to FIG. 1, which illustrates by way of example a cylinder of an internal combustion engine, which is possibly also a multi-cylinder internal combustion engine, together with the most important functional units.

Figure 1:
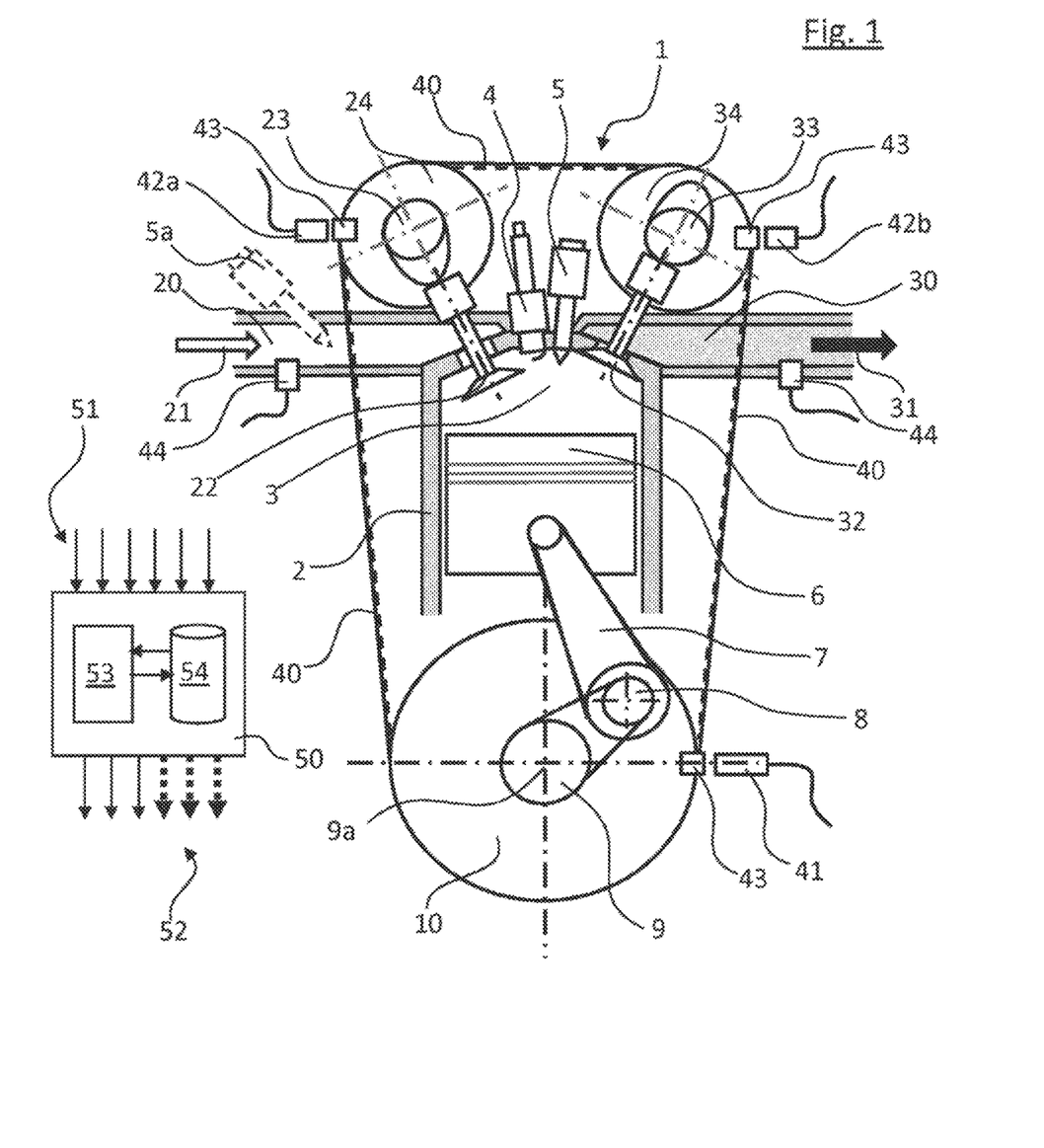
FIG. 1: shows a simplified schematic drawing of a reciprocating-piston internal combustion engine.

The respective reciprocating piston 6 is arranged in linearly movable fashion in the respective cylinder 2 and, together with the cylinder 2, encloses a combustion chamber 3. The respective reciprocating piston 6 is connected by means of a so-called connecting rod 7 to a respective crankpin 8 of a crankshaft 9, wherein the crankpin 8 is arranged eccentrically with respect to the crankshaft axis of rotation 9a. As a result of the combustion of a fuel-air mixture in the combustion chamber 3, the reciprocating piston 6 is driven linearly "downward". The translational stroke movement of the reciprocating piston 6 is transmitted by means of the connecting rod 7 and crankpin 8 to the crankshaft 9 and is converted into a rotational movement of the crankshaft 9, which causes the reciprocating piston 6, after it passes through a bottom dead center in the cylinder 2, to be moved "upward" again in the opposite direction as far as a top dead center. To permit continuous operation of the internal combustion engine 1, during a so-called working cycle of a cylinder 2, it is necessary firstly for the combustion chamber 3 to be filled with the fuel-air mixture, for the fuel-air mixture to be compressed in the combustion chamber 3 and to then be ignited and burned in an expanding fashion in order to drive the reciprocating piston 6, and finally for the exhaust gas that remains after the combustion to be discharged from the combustion chamber 3. Continuous repetition of this sequence results in continuous operation of the internal combustion engine 1, with work being output in a manner proportional to the combustion energy.

Depending on the engine concept, a working cycle of the cylinder is divided into two strokes distributed over one crankshaft rotation (360°) (two-stroke engine) or into four strokes distributed over two crankshaft rotations (720°) (four-stroke engine). To date, the four-stroke engine has become established as a drive for motor vehicles. In an intake stroke, with a downward movement of the reciprocating piston 6, fuel-air mixture or else only fresh air (in the case of fuel direct injection) is introduced from the air intake tract 20 into the combustion chamber 3. During the following compression stroke, with an upward movement of the reciprocating piston 6, the fuel-air mixture or the fresh air is compressed in the combustion chamber 3, and if appropriate fuel is separately injected by means of an injection valve 5, which belongs to a fuel supply system, directly into the combustion chamber 3. In the following working stroke, the fuel-air mixture is ignited by means of an ignition plug 4 in a spark ignition engine and by auto-ignition in a diesel engine, burned with an expanding action and expanded, outputting work, during a downward movement of the reciprocating piston 6. Finally, in an exhaust stroke, with another upward movement of the reciprocating piston 6, the remaining exhaust gas is discharged out of the combustion chamber 3 into the exhaust-gas outlet tract 30.

The delimitation of the combustion chamber 3 with respect to the air intake tract 20 or exhaust-gas outlet tract 30 of the internal combustion engine is realized generally, and in the example taken as a basis here, by means of inlet valves 22 and outlet valves 32. In the current art, said valves are actuated by means of at least one camshaft. The example shown has an inlet camshaft 23 for actuating the inlet valves 22 and has an outlet camshaft 33 for actuating the outlet valves 32. There are normally yet further mechanical components (not illustrated here) for force transmission provided between the valves and the respective camshaft, which components may also include a valve play compensation means (e.g. bucket tappet, rocker lever, finger-type rocker, tappet rod, hydraulic tappet etc.).

The inlet camshaft 23 and the outlet camshaft 33 are driven by means of the internal combustion engine 1 itself. For this purpose, the inlet camshaft 23 and the outlet camshaft 33 are coupled in each case by means of suitable inlet camshaft control adapters 24 and outlet camshaft control adapters 34, such as for example toothed gears, sprockets, or belt pulleys using a control mechanism 40, which has for example a toothed gear mechanism, a control chain or a toothed control belt, in a predefined position with respect to one another and with respect to the crankshaft 9 by means of a corresponding crankshaft control adapter 10, which is correspondingly embodied as a toothed gear, sprocket or belt pulley, to the crankshaft 9. By means of this connection, the rotational position of the inlet camshaft 23 and of the outlet camshaft 33 in relation to the rotational position of the crankshaft 9 is, in principle, defined. The above-mentioned drive section between the crankshaft and the camshaft is referred to below as a valve drive.

By way of example, FIG. 1 illustrates the coupling between inlet camshaft 23 and the outlet camshaft 33 and the crankshaft 9 by means of belt pulleys and a toothed control belt. The coupling between the inlet camshaft 23 and the outlet camshaft 33 and the crankshaft 9 is formed in a similar way by means of sprockets and a control chain. These two embodiments constitute the currently most customary embodiments of the valve drive. The rotational angle covered by the crankshaft during one working cycle will hereinafter be referred to as working phase or simply as phase. A rotational angle covered by the crankshaft within one working phase is accordingly referred to as phase angle. The respectively current crankshaft phase angle of the crankshaft 9 can be detected continuously by means of a position encoder 43 connected to the crankshaft 9, or to the crankshaft control adapter 10, and an associated crankshaft position sensor 41. Here, the position encoder may be formed for example as a toothed gear with a multiplicity of teeth arranged so as to be distributed equidistantly over the circumference, wherein the number of individual teeth determines the resolution of the crankshaft phase angle signal. It is likewise possible, if appropriate, for the present phase angles of the inlet camshaft 23 and of the outlet camshaft 33 to be detected continuously by means of corresponding position encoders 43 and associated camshaft position sensors 42.

Since, owing to the predefined mechanical coupling, the respective crankpin 8, and with the latter the reciprocating piston 6, the inlet camshaft 23, and with the latter the respective inlet valve 22, and the outlet camshaft 33, and with the latter the respective outlet valve 32, move in a predefined relationship with respect to one another and in a manner dependent on the crankshaft rotation, said functional components run through the respective working phase synchronously with respect to the crankshaft 9. The respective rotational positions of the crankshaft 9, the inlet camshaft 23 and the outlet camshaft 33 as well as the stroke positions of the reciprocating piston 6, inlet valves 22 and outlet valves 32 can thus be set, taking into consideration the respective transmission ratios, in relation to the crankshaft phase angle of the crankshaft 9 predefined by the crankshaft position sensor 41. In an ideal internal combustion engine, it is thus possible for every particular crankshaft phase angle to be assigned a particular crankpin angle HZW (FIG. 2), a particular piston stroke, a particular inlet camshaft angle and thus a particular inlet valve stroke and also a particular outlet camshaft angle and thus a particular outlet valve stroke. That is to say, all of the stated components are, or move, in phase with the rotating crankshaft 9.

In modern internal combustion engines 1, it is however possible for additional positioning elements to be provided within the mechanical coupling path between crankshaft 9 and inlet camshaft 23 and the outlet camshaft 33, for example in a manner integrated into the inlet camshaft adapter 24 and the outlet camshaft adapter 34, which positioning elements can effect a desired controllable phase shift between the crankshaft 9 and inlet camshaft 23 and the outlet camshaft 33. These are known as so-called phase adjusters in so-called variable valve drives. Also symbolically illustrated is an electronic, programmable engine control unit 50 (CPU) for controlling the engine functions, which engine control unit 50 is equipped with signal inputs 51 for receiving the various sensor signals and with signal and power outputs 52 for actuating corresponding positioning units and actuators and with an electronic computing unit 53 and an assigned electronic memory unit 54.

SUMMARY

For example, some embodiments include a method for detecting deviations occurring in the valve drive of an internal combustion engine, characterized in that an inlet valve stroke phase difference ($\Delta$EVH) and/or an outlet valve stroke phase difference ($\Delta$AVH) are acquired by means of analysis of dynamic pressure oscillations of the intake air in the air intake tract of the respective internal combustion engine (1) during operation, and a valve stroke phase deviation value (VhP_Aww) with respect to a valve stroke phase reference value ($\Delta$VH_Ref) is acquired therefrom, wherein a first valve drive deviation value (VT_Aww_1) is acquired on the basis of the valve stroke phase deviation value (VhP_Aww).

In some embodiments, in addition an inlet camshaft angle difference ($\Delta$ENW) and/or an outlet camshaft angle difference ($\Delta$ANW) are acquired by means of an arrangement of a crankshaft position sensor (41) and an inlet camshaft position sensor (42a) and/or outlet camshaft position sensor (42b) during operation, and a second valve drive deviation value (VT_Aww_2) is acquired therefrom, and wherein the first and the second valve drive deviation value are compared with one another for the purpose of reciprocal plausibility checking, and a valve drive deviation comparison value ($\Delta$VT_Aww) is formed.

In some embodiments, the first and/or the second valve drive deviation value are evaluated as plausible as long as the valve drive deviation comparison value ($\Delta$VT_Aww) does not exceed a predefined valve drive deviation comparison limiting value ($\Delta$VT_Aww_Gw).

In some embodiments, a malfunction (VT_Ffkt) during the operation of the valve drive is detected as soon as the valve drive deviation comparison value ($\Delta$VT_Aww) exceeds a stipulated valve drive deviation comparison limiting value ($\Delta$VT_Aww_Gw) at least once.

In some embodiments, compensating control correction measures (Ktr_M$\beta$n) for controlling the internal combustion engine (1) and/or a fault message (Info_Sig) are brought about by means of a control unit (50) of the internal combustion engine (1) as long as the first and/or the second valve drive deviation values (VT_Aww_1, VT_Aww_2) have been evaluated as plausible and do not exceed a predefined valve drive deviation limiting value (VT_Aww_Gw) and an emergency operating mode or emergency stop and/or a fault message of the internal combustion engine brought about by means of a control unit (50) of the internal combustion engine (1) if the first and/or the second valve drive deviation value (VT_Aww_1, VT_Aww_2) have been evaluated as plausible and exceed a predefined valve drive deviation limiting value (VT_Aww_Gw), or a malfunction (VT_Ffkt) has already been previously detected in the region of the valve drive.

In some embodiments, the first and/or the second valve drive deviation values (VT_Aww_1, VT_Aww_2) are acquired continuously during the operation of the internal combustion engine (1), and a respective deviation profile of the first and/or of the second valve drive deviation value (VT_Aww_1, VT_Aww_2) is produced over time, wherein specific causes of the deviations in the valve drive are detected on the basis of the respective deviation profile.

In some embodiments, when there is a continuously rising value of the deviation profile, a wear-induced cause of the deviation in the valve drive is detected, which cause corresponds, depending on the design of the valve drive, to a lengthening of a chain, lengthening of a toothed belt or to wear of a gear wheel, and in that when there is a suddenly rising value of the deviation profile, a tooth-jump-induced cause of the deviation in the valve drive is detected.

In some embodiments, in order to acquire the inlet valve stroke phase difference and/or the outlet valve stroke phase difference of the internal combustion engine during operation, a corresponding pressure oscillation signal is generated from the measured pressure oscillations, and at the same time a crankshaft phase angle signal is acquired; the phase position and/or the amplitude of at least one selected signal frequency of the measured pressure oscillations in relation to the crankshaft phase angle signal are acquired from the pressure oscillation signal using discrete Fourier transformation; on the basis of the acquired phase position and/or amplitude of the respective selected signal frequency, in each case as a function of lines of an equal phase position and/or of equal amplitude of the respectively same signal frequency are acquired, which lines are dependent on the inlet valve stroke phase difference and the outlet valve stroke phase difference, using reference lines of the equal phase position and/or of the equal amplitude of the respective signal frequency; a respective common intersection point of the acquired lines of the equal phase position and/or equal amplitude is acquired, and the inlet valve stroke phase difference and/or the outlet valve stroke phase difference is determined from the acquired common intersection point.

In some embodiments, the method is executed on an electronic computing unit (53) which is assigned to an electronic, programmable engine control unit (50) of the internal combustion engine (1) and is functionally connected thereto.

As another example, some embodiments include an electronic, programmable engine control unit (50) for controlling an internal combustion engine, having an assigned electronic computing unit (53) and an assigned electronic memory unit (54), characterized in that the electronic computing unit (53) and the electronic memory unit (54) are configured, inter alia, to execute a method described above and to correspondingly control the internal combustion engine (1) by means of the engine control unit.

BRIEF DESCRIPTION OF THE DRAWINGS

The exemplary embodiments and developments of the subject matter described in the present disclosure are explained below with reference to the figures, in which respect.

Parts which are identical in terms of function and designation are denoted by the same reference signs throughout the figures.

DETAILED DESCRIPTION

For optimum operation of the internal combustion engine (with regard to emissions, consumption, power, running smoothness etc.), the fresh-gas charge introduced into the combustion chamber during the intake stroke should be known to the best possible extent in order to enable the further parameters for the combustion, such as for example the fuel quantity which is to be supplied, and which is possibly directly injected, to be coordinated therewith. The so-called charge exchange, that is to say the intake of fresh gas and the discharge of the exhaust gas, is in this case highly dependent on the control timing of the inlet valves 22 and outlet valves 32, that is to say on the profile with respect to time of the respective valve strokes in relation to the profile with respect to time of the piston stroke. In other words, during operation, the charge exchange is dependent on the phase positions of the inlet and outlet valves in relation to the crankshaft phase angle and thus in relation to the phase position of the reciprocating piston.

The prior art for acquiring the fresh-gas charge and for coordinating the control parameters of the internal combustion engine therewith comprises measuring a so-called reference internal combustion engine in all occurring operating states, for example as a function of the rotational speed, the load, if appropriate of the valve control timings predefinable by means of phase adjusters, if appropriate the operating parameters of exhaust-gas turbocharger or supercharger etc., and storing these measurement values or derivatives thereof or model approaches representing the behavior on the engine control unit of a corresponding series-production internal combustion engine. All structurally identical, series-produced internal combustion engines of the same type series are then operated with this reference dataset that is generated.

A deviation, resulting for example from manufacturing tolerances or wear, of the actual relative positions between inlet valves and outlet valves and the crankshaft phase angle or the reciprocating-piston position of a series-production internal combustion engine in relation to the ideal reference positions of the reference internal combustion engine, that is to say a phase difference of the inlet valve stroke and of the outlet valve stroke in relation to the crankshaft phase angle, predefined by the crankshaft position sensor, or the phase position of the crankshaft and therefore the piston stroke, has the effect that the fresh-gas charge actually drawn in deviates from the fresh-gas charge determined as a reference, and thus the control parameters based on the reference dataset are not optimum. During the operation of the internal combustion engine, these errors can have adverse effects with regard to emissions, consumption, power, running smoothness etc.

Figure 2:
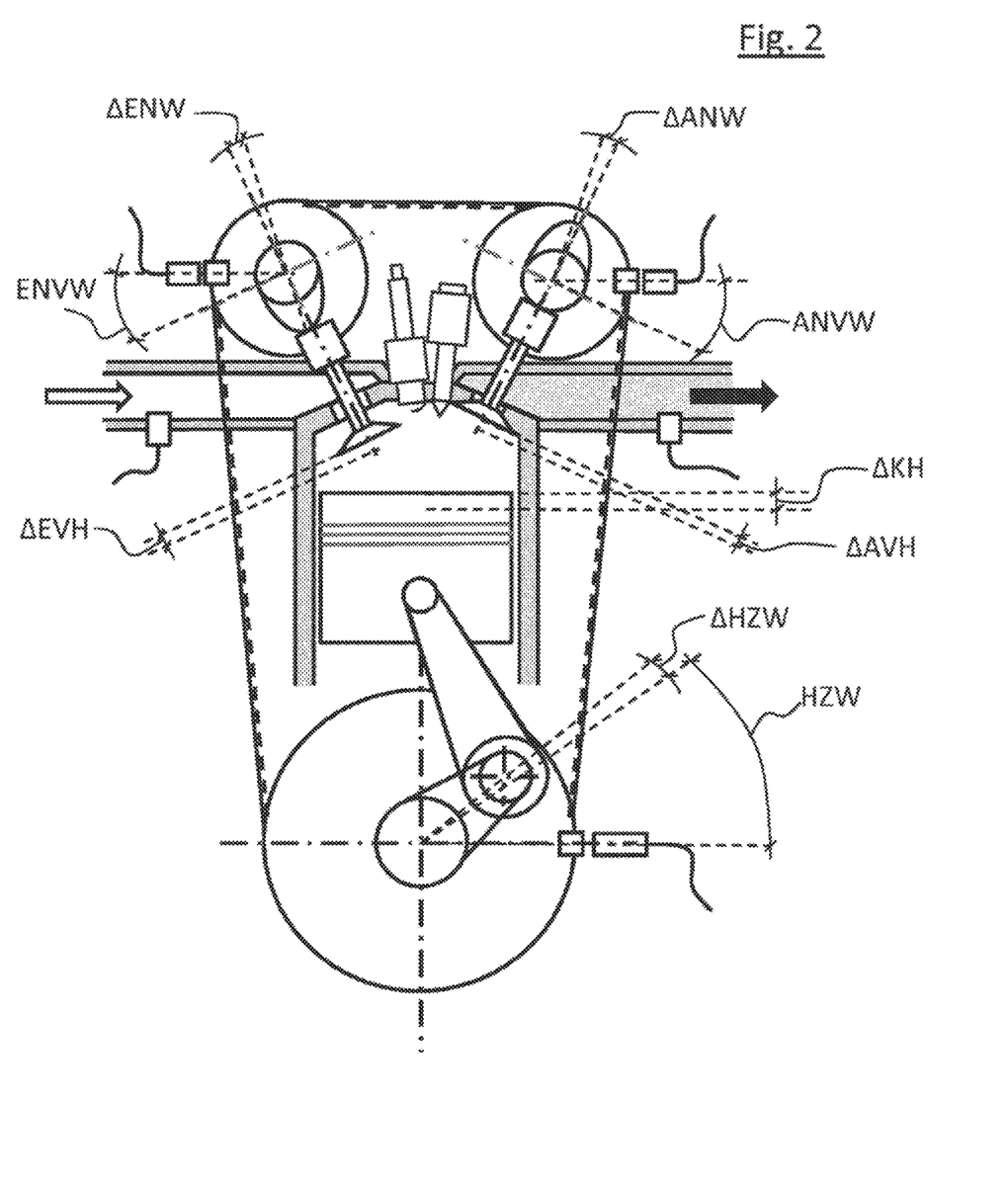
FIG. 2: shows the schematic drawing as per FIG. 1, with labeling of the possible position and angle deviations of significant components of the reciprocating-piston internal combustion engine.

For the illustration of the possible deviations that occur in a series-production internal combustion engine, and for the definition of the nomenclature of said deviations, reference will be made below to FIG. 2, which shows the internal combustion engine from FIG. 1 but in which, for a better overview, the reference designations illustrated in FIG. 1 have been omitted and only the corresponding deviations are designated. Proceeding from a reference position of the position encoder 43 arranged on the crankshaft control adapter 10, the phase angle of which position encoder is detected by the crankshaft position sensor 41, there are resulting multiple tolerance chains that lead to deviations of the phase positions, hereinafter also referred to as phase differences, of reciprocating pistons 6, inlet valves 22 and outlet valves 32 in relation to the ideal reference phase positions.

Here, the piston stroke phase difference $\Delta KH$ results for example from a deviation of the crankpin angle HZW, the so-called crankpin angle difference $\Delta HZW$, in relation to the reference position of the crankshaft position sensor 41 and from different dimensional tolerances (not illustrated) of connecting rod 7 and reciprocating piston 6. Furthermore, the inlet valve stroke phase difference $\Delta EVH$ results for example from a deviation in the cam position, the so-called inlet camshaft angle difference ΔENW, owing to mechanical tolerances or deformations (not illustrated) of the camshaft itself, of the inlet camshaft control adapter 24 and of the control mechanism 40. If a phase adjuster for the inlet camshaft is present, then consideration is possibly also given to an inlet camshaft adjustment angle ENVW or to a deviation thereof from the setpoint.

In the same way, the outlet valve stroke phase difference ΔAVH results for example from a deviation in the cam position, the so-called outlet camshaft angle difference ΔANW, owing to mechanical tolerances or deformations (not illustrated) of the camshaft itself, of the outlet camshaft control adapter 24 and of the control mechanism 40. If a phase adjuster for the outlet camshaft is present, then consideration is possibly also given to an outlet camshaft adjustment angle ANVW or to a deviation thereof from the setpoint.

Deviations in the form of the inlet camshaft angle difference ΔENW and the outlet camshaft angle difference ΔANW frequently occur owing to wear phenomena such as, for example, the lengthening of control chains or toothed belts which occurs during operation, and the wear of the chain wheels or belt wheels or else gear wheels. In this context, in an unfavorable case entire tooth jumps, this is so the slipping through of the control chain or of the toothed belt by one tooth or even a plurality of teeth, can occur. Such deviations cannot be sensed and corrected, as for example, can manufacturing-induced mechanical tolerances, by one-off measurement of the internal combustion engine before it is put into service, since they only occur during operation and, under certain circumstances, change in a continuously gradual fashion.

In order to counteract this problematic situation, most currently known systems operate with a reference point system (position encoder feedback). Here, in each case one position encoder as a position mark which can be sensed by means of a sensor is placed on the crankshaft and on the inlet camshaft and/or on the outlet camshaft, or also on the respective crankshaft control adapter and on the inlet camshaft control adapter and/or on the outlet camshaft control adapter, or also on a phase adjuster that may be provided, etc. As a result, the relative phase position of the respective inlet camshaft and/or outlet camshaft with respect to the position of the crankshaft can be acquired, and deviations from the aimed—at reference values can be identified. The undesired effects of said deviations can then be counteracted in the control unit by means of an adaptation or correction of corresponding control parameters in a manner dependent on the acquired deviations.

Corresponding methods are taught, for example, in documents DE 195 03 457 C1, EP 1 915 516 B1, and FR 2 850 755 B1. On the other hand, in the patent applications DE 10 2015 209 665.3, DE 10 2015 222 408.2, DE 10 2016 219 584.0, and DE 10 2016 219 582.4 which are still unpublished, various methods are presented which permit the inlet valve stroke phase difference, the outlet valve stroke phase difference and the piston stroke phase difference to be acquired during operation on the basis of dynamic pressure oscillations, the intake air in the intake tract of the respective internal combustion engine, independently of corresponding position encoders and position sensors on the camshafts.

In this context, during the operation of the internal combustion engine the dynamic pressure oscillations, which can be assigned to the respective cylinder, in the air intake tract are measured and the corresponding pressure oscillation signal is generated therefrom. A crankshaft phase angle signal is acquired at the same time. The phase position and/or the amplitude of at least one selected signal frequency of the measured pressure oscillations in relation to the crankshaft phase angle signal are acquired from the pressure oscillation signal using discrete Fourier transformation.

Then, on the basis of the acquired phase positions and/or amplitudes of the respective selected signal frequencies, lines of an equal phase position and of equal amplitude of the respectively same signal frequency are acquired using reference lines of the equal phase position and of the equal amplitude of the respective signal frequency, which reference lines are stored in reference line characteristic diagrams or acquired by means of a respective algebraic model function. Then, the inlet valve stroke phase difference and the outlet valve stroke phase difference and, if appropriate, the piston stroke phase difference are determined from the acquired common intersection point of the lines of equal phase positions and of the lines of equal amplitudes of the respective signal frequencies.

A person skilled in the art will include all components that serve for the supply of air to the respective combustion chambers of the cylinders, and which thus define the so-called air path, under the term "air intake tract" or also simply "intake tract", "intake system" or "inlet tract" of an internal combustion engine. These terms may include, for example, an air filter, an intake pipe, an intake manifold or distributor pipe or, for short, suction pipe, a throttle flap valve, as well as, if appropriate, a compressor and the intake opening in the cylinder and/or the inlet duct of the cylinder.

For the analysis of the pressure oscillation signal, the latter is subjected to a discrete Fourier transformation (DFT). For this purpose, an algorithm known as a fast Fourier transformation (FFT) may be used for the efficient calculation of the DFT. By means of DFT, the pressure oscillation signal is now broken down into individual signal frequencies which can thereafter be separately analyzed in simplified fashion with regard to their amplitude and the phase position.

It has been found that both the phase position and the amplitude of selected signal frequencies of the pressure oscillation signal are dependent on the valve control timings, that is to say on the phase profiles of the inlet valve stroke, of the outlet valve stroke and of the piston stroke of the internal combustion engine. The phase position of a signal frequency characterizes here the relative position of the signal frequency signal in relation to the crankshaft rotational angle signal, and the amplitude is a measure of the amount of deflection of the signal frequency signal in relation to a center line.

Ever stricter legal requirements in respect of the operational safety of an internal combustion engine, in particular with respect to the exhaust gas emissions which are caused, require the actual sensor data and operating data which are obtained and used for the corresponding control of the internal combustion engine, to be continuously monitored during ongoing operation and for their plausibility to be checked within the scope of self-diagnostics and for their susceptibility to errors to be checked. With respect to the deviations which occur in the valve drive of an internal combustion engine and are sensed with the above-mentioned methods known from the prior art, this has previously not been possible, since a correspondingly redundant value for plausibility checking was not available in the past.

The teachings of the present disclosure describe methods and engine control units with which a valve drive deviation value which is comparable with a conventionally acquired valve drive deviation value can be made available as far as possible without additional expenditure on technical equipment, with the result that the two valve drive deviation values can be used for reciprocal plausibility checking.

In some embodiments, the method for detecting deviations occurring in the valve drive of an internal combustion engine is characterized in that an inlet valve stroke phase difference and/or an outlet valve stroke phase difference are acquired by means of analysis of dynamic pressure oscillations of the intake air in the air intake tract of the respective internal combustion engine during operation, and a valve stroke phase deviation value with respect to a valve stroke phase reference value is acquired therefrom, wherein a first valve drive deviation value is acquired on the basis of the valve stroke phase deviation value.

In some embodiments, the inlet valve stroke phase difference and/or an outlet valve stroke phase difference are acquired directly, but between the crankshaft and the inlet valves and outlet valves there are, apart from the valve drive, also further transmission components, such as for example the cams of the camshaft itself or the connection between the camshaft and the respective camshaft control adapter, the valve drive deviation value does not correspond directly to the acquired inlet valve stroke phase difference and/or the outlet valve stroke phase difference. Therefore, for example at the initial putting into service there is already an inlet valve stroke phase difference and/or an outlet valve stroke phase difference, whereas with respect to the valve drive it is assumed that when the first putting into service occurs the valve drive is adjusted into the setpoint position and firstly does not have a deviation. A valve drive deviation value occurs with respect to the adjusted initial setpoint position as a reference value, only in the course of the continuing operation. Accordingly, the inlet valve stroke phase difference and/or outlet valve stroke phase difference which are determined at the first putting into service are also acquired and stored as valve stroke phase reference values, to which reference is made in all the further measurements. The difference between the respective currently acquired inlet valve stroke phase difference and/or the outlet valve stroke phase difference and the associated valve stroke phase reference value results in a valve stroke phase deviation value on the basis of which the valve drive deviation value can be acquired, for example using the transmission ratio of the valve drive.

In some embodiments, an electronic, programmable engine control unit for controlling an internal combustion engine has an assigned electronic computing unit and an assigned electronic memory unit and is characterized in that the electronic computing unit and the electronic memory unit are configured, inter alia, to execute a method as described above and to correspondingly control the internal combustion engine by means of the engine control unit. For this purpose, for example a corresponding program algorithm and the necessary reference values are stored in the electronic memory unit and then called for execution by means of the electronic computing unit.

The methods and the engine control units described herein have the advantage that without an additional sensor system and particular expenditure on technical equipment a valve drive deviation value can be acquired independently of position encoders and position sensors which are assigned to the valve drive, thereby providing means for performing plausibility checking of the valve drive deviation value. The schematic illustration of a reciprocating piston internal combustion engine 1 which is shown in FIGS. 1 and 2, with the functional components which are decisive with respect to the subject matter of this patent application, and the possible deviations which occur, and for the purpose of defining the designation of these deviations, has already been explained.

Figure 3:
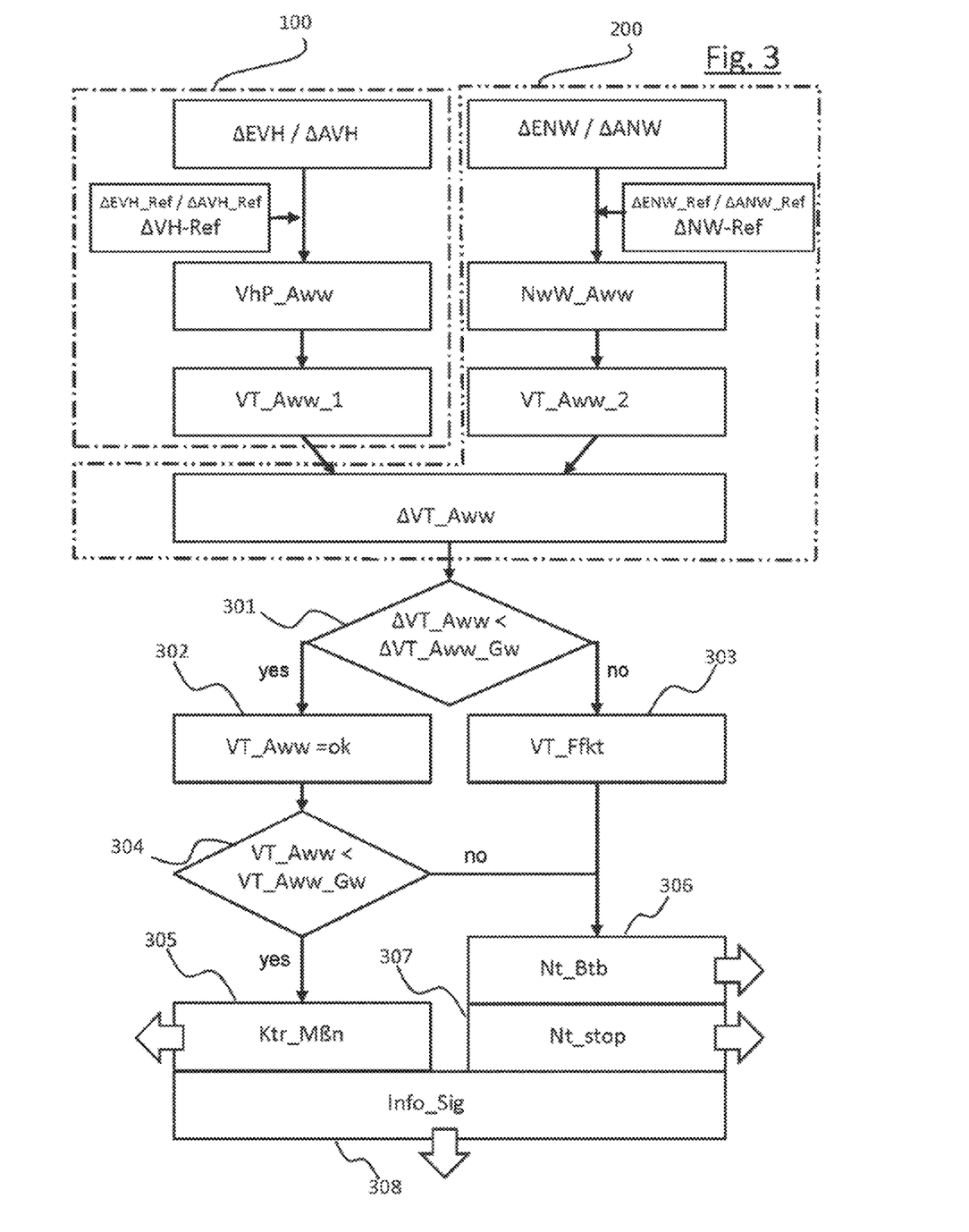
FIG. 3: shows a simplified illustration of the method sequence incorporating teachings of the present disclosure, in a block diagram illustration.

FIG. 3 shows a simplified, schematic block diagram for the exemplary illustration of a method sequence incorporating teachings of the present disclosure. In the region of the diagram which is surrounded by the box 100, the method for the detection of deviations occurring in the valve drive of an internal combustion engine is summarized. In some embodiments, the method is characterized in that firstly an inlet valve stroke phase difference $\Delta EVH$ and/or an outlet valve stroke phase difference $\Delta AVH$ are acquired by means of analysis of dynamic pressure oscillations of the intake air in the air intake tract 20 of the respective internal combustion engine 1 during operation.

For example an inlet valve stroke phase reference value $\Delta EVH\_Ref$ or an outlet valve stroke phase reference value $\Delta AVH\_Ref$, a valve stroke phase deviation value $VhP\_Aww$, with respect to an assigned valve stroke phase reference value $\Delta VH\_Ref$, is then acquired from the inlet valve stroke phase difference $\Delta EVH$ or from the outlet valve stroke phase difference $\Delta AVH$, or from both values together, for example by forming mean values $((\Delta EVH+\Delta AVH)/2)$. This can be done, for example, easily by forming differences in accordance with $$VhP\_Aww=\Delta EVH-\Delta EVH\_Ref \text{ or}$$

$$VhP\_Aww=\Delta AVH-\Delta AVH\_Ref \text{ or}$$

$$VhP\_Aww=((\Delta EVH+\Delta AVH)/2)-\Delta VH\_Ref$$

The corresponding valve stroke phase reference values $\Delta VH\_Ref$, $\Delta EVH\_Ref$, $\Delta AVH\_Ref$ are, for example, values which were acquired when the internal combustion engine was first put into service and are stored in an electronic memory unit of the engine control unit of the internal combustion engine.

Subsequent to this, a first valve drive deviation value $VT\_Aww\_1$ may then be acquired on the basis of the valve stroke phase deviation value $VhP\_Aww$. This can be done, for example, by using the transmission ratios between the inlet valves 22 or outlet valves 32 and the crankshaft 9. In order to acquire the inlet valve stroke phase difference $\Delta EVH$ and/or an outlet valve stroke phase difference $\Delta AVH$, it is possible, in some embodiments, to use, for example, one of the methods from Applicant's patent applications DE 10 2015 209 665.3, DE 10 2015 222 408.2, DE 10 2016 219 584.0, and DE 10 2016 219 582.4. The presented methods make it possible to acquire the inlet valve stroke phase difference $\Delta EVH$, the outlet valve stroke phase difference $\Delta AVH$ and the piston stroke phase difference $\Delta KH$ on the basis of dynamic pressure oscillations of the intake air in the air intake tract of the respective internal combustion engine, independently of corresponding position encoders 43 and position sensors 42 at the camshafts during operation.

In this context, for example during the operation of the internal combustion engine, the dynamic pressure oscillations, which can be assigned to the respective cylinder, in the air intake tract 20 are measured and the corresponding pressure oscillation signal is generated therefrom. A crankshaft phase angle signal is acquired at the same time. The phase position and/or the amplitude of at least one selected signal frequency of the measured pressure oscillations in relation to the crankshaft phase angle signal are acquired from the pressure oscillation signal using discrete Fourier transformation.

Then, on the basis of the acquired phase positions and/or amplitudes of the respective selected signal frequencies, lines of an equal phase position and/or of equal amplitude of the respectively same signal frequency are acquired using reference lines of the equal phase position and of the equal amplitude of the respective signal frequency, which reference lines are stored in reference line characteristic diagrams or acquired by means of a respective algebraic model function. Then, the inlet valve stroke phase difference and the outlet valve stroke phase difference and, if appropriate, the piston stroke phase difference are determined from the acquired common intersection point of the lines of equal phase positions and/or of the lines of equal amplitudes of the respective signal frequencies.

A person skilled in the art will include all components that serve for the supply of air to the respective combustion chambers of the cylinders, and which thus define the so-called air path, under the term "air intake tract" or also simply "intake tract", "intake system" or "inlet tract" of an internal combustion engine. These terms may include, for example, an air filter, an intake pipe, an intake manifold or distributor pipe or, for short, suction pipe, a throttle flap valve, as well as, if appropriate, a compressor and the intake opening in the cylinder and/or the inlet duct of the cylinder.

For the analysis of the pressure oscillation signal, the latter is subjected to a discrete Fourier transformation (DFT). For this purpose, an algorithm known as a fast Fourier transformation (FFT) may be used for the efficient calculation of the DFT. By means of DFT, the pressure oscillation signal is now broken down into individual signal frequencies which can thereafter be separately analyzed in simplified fashion with regard to their amplitude and the phase position.

In some embodiments, both the phase position and the amplitude of selected signal frequencies of the pressure oscillation signal are dependent on the valve control timings, that is to say on the phase profiles of the inlet valve stroke, of the outlet valve stroke and of the piston stroke of the internal combustion engine. The phase position of a signal frequency characterizes here the relative position of the signal frequency signal in relation to the crankshaft rotational angle signal, and the amplitude is a measure of the amount of deflection of the signal frequency signal in relation to a center line.

In some embodiments, as shown in the region of the diagram in FIG. 3 which is surrounded by the box 200, an inlet cam shaft angle difference ΔENW and/or an outlet cam shaft angle difference ΔANW are/is additionally acquired by means of an arrangement of a crankshaft position sensor 41 and an inlet camshaft position sensor 42a and/or an outlet camshaft position sensor during 42b during operation, and a second valve drive deviation value VT_Aww_2 is acquired therefrom. The second valve drive deviation value VT_Aww_2 and the first valve drive deviation value, preferably acquired in parallel in chronological terms, VT_Aww_1 then compared with one another for the purpose of reciprocal plausibility checking, wherein a valve drive deviation comparison value (ΔVT_Aww) is formed. Plausibility checking of the valve drive deviation value can be performed easily and without additional expenditure on technical equipment, since only the signals of the sensor components, in particular pressure sensors and position sensors, which are present in any case, are evaluated in the way described.

For example, as illustrated in FIG. 3, in a procedure analogous to the acquisition of the first valve drive deviation value (VT_Aww_1), the method may include acquiring a camshaft angle deviation value NwW_Aww, in relation to an inlet camshaft angle reference value ΔENW-Ref, an outlet camshaft angle reference value ΔANW-Ref or a common camshaft angle reference value ΔNW-Ref, from the inlet camshaft angle difference ΔENW and/or the outlet camshaft angle difference ΔANW. In this context, the inlet camshaft angle difference ΔENW and the outlet camshaft angle difference ΔANW can also be considered separately or in combination, for example by forming mean values ((ΔENW+ΔANW)/2). This can be done, for example, easily by forming differences in accordance with:

NwW_Aww=ΔENW−ΔENW_Ref or

NwW_Aww=ΔANW−ΔANW_Ref or

NwW_Aww=((ΔENW+ΔANW)/2)−AVH_Ref

The corresponding camshaft angle reference values ΔNW-Ref, ΔENW_Ref, ΔANW_Ref are, for example values which were acquired when the internal combustion engine was first put into service and are stored in an electronic memory unit of the engine control unit of the internal combustion engine. The second valve drive deviation value (VT_Aww_2) is then acquired on the basis of the camshaft angle deviation value NwW_Aww, e.g. using the mechanical transmission ratios and, if appropriate, the angle position of phase adjusters.

Figure 4:
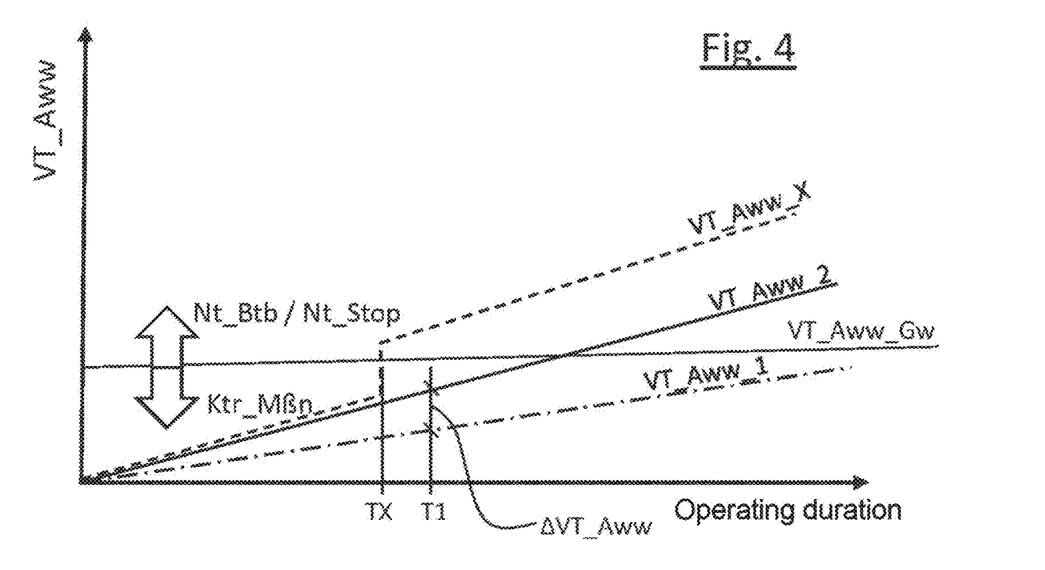
FIG. 4: shows a two-dimensional diagram for the exemplary illustration of the profile of different valve drive deviation values over the operating duration of an internal combustion engine with a plotted valve drive deviation limiting value.

FIG. 4 shows in this respect various profiles of valve drive deviation values VT_Aww over the service life of the internal combustion engine. A profile of a first valve drive deviation value which is denoted by VT_Aww_1 and a profile of a second valve drive deviation value which is denoted by VT_Aww_2 are illustrated. Both profiles show a slowly continuous rise in the respective valve drive deviation value, wherein the second valve drive deviation value VT_Aww_2 rises more strongly than the first valve drive deviation value VT_Aww_1. The acquisition of the valve drive deviation comparison value ΔVT_Aww at a time T1 is plotted as an interval or difference between the valve drive deviation values VT_Aww_1 and VT_Aww_2.

Such a continuous profile of the valve drive deviation values characterises, for example, continuously increasing wear of the transmission elements. In order to illustrate another cause of a deviation in the valve drive, a curve denoted by VT_Aww_X is plotted. Said curve shows, at a time TX, a sudden rise in the valve drive deviation value VT_Aww_X, such as would occur, for example, in the case of a tooth jump of a toothed belt, that is to say when the toothed belt slips by one or more teeth on the toothed belt wheel.

Figure 5:
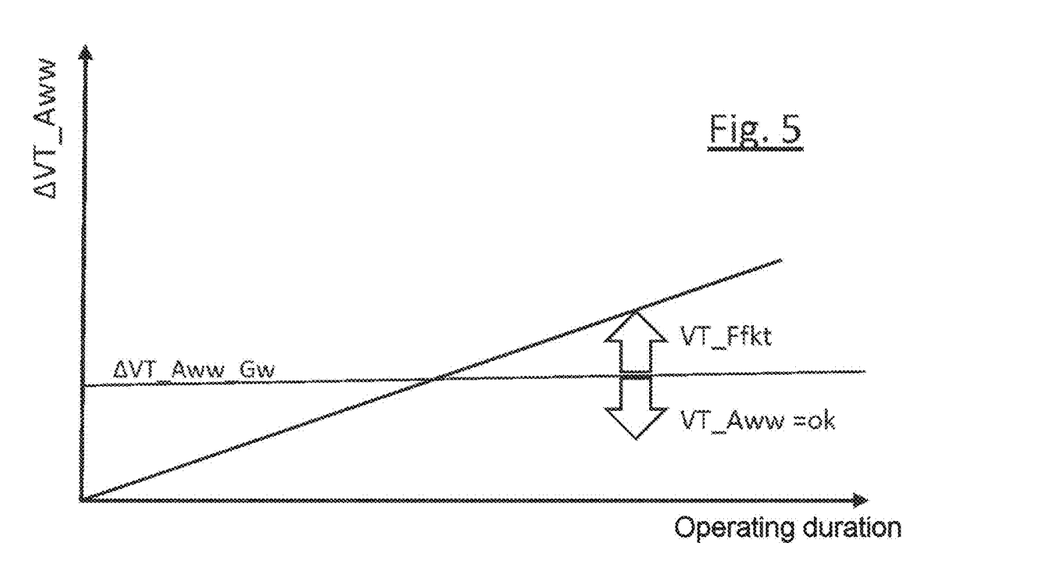
FIG. 5: shows a two-dimensional diagram for the exemplary illustration of the profile of a valve drive deviation difference value over the operating duration of an internal combustion engine with a plotted valve drive deviation difference limiting value.

In some embodiments, in conjunction with the reciprocal plausibility checking of the valve drive deviation values VT_Aww_1 and VT_Aww_2, and the formation of a valve drive deviation comparison value ΔVT_Aww, the first and/or the second valve drive deviation values VT_Aww_1 and VT_Aww_2 are evaluated as plausible as long as the valve drive deviation comparison value ΔVT_Aww does not exceed a defined valve drive deviation comparison limiting value ΔVT_Aww_Gw. This procedure is illustrated by the sequence steps 301 and 302 in the block diagram in FIG. 3. In the sequence step 301, the acquired valve drive deviation comparison value ΔVT_Aww is checked to determine whether it is lower or higher than a predefined, previously stipulated valve drive deviation comparison limiting value ΔVT_Aww_Gw. If the valve drive deviation comparison value ΔVT_Aww is lower, the acquired valve drive deviation values in the sequence step 302 are evaluated as plausible VT_Aww=ok and can be used as an input variable for corresponding control algorithms of the internal combustion engine. This ensures a type of self-diagnosis which increases the fault-free operational reliability of the internal combustion engine. This relationship is also illustrated in the diagram in FIG. 5. Here, an example of a profile of the valve drive deviation comparison value ΔVT_Aww is illustrated over the service life of the internal combustion engine and shows a continuously rising profile of the valve drive deviation comparison value ΔVT_Aww. The valve drive deviation comparison limiting value ΔVT_Aww_Gw is also plotted. As long as the valve drive deviation comparison value ΔVT_Aww is below the ΔVT_Aww_Gw, the underlying valve drive deviation value VT_Aww is evaluated as OK, that is to say as plausible.

In some embodiments, in conjunction with the reciprocal plausibility checking of the valve drive deviation values VT_Aww_1 and VT_Aww_2 and the formation of a valve drive deviation comparison value ΔVT_Aww, a malfunction VT_Ffkt is detected in the region of the valve drive as soon as the valve drive deviation comparison value ΔVT_Aww exceeds a stipulated valve drive deviation comparison limiting value ΔVT_Aww_Gw at least once. This is symbolized in FIG. 3 by the sequence steps 301 and 303 as well as in FIG. 5 by the region above the valve drive deviation comparison limiting value ΔVT_Aww_Gw. In this way, a serious malfunction of the valve drive can be reliably detected and, if appropriate, measures can be taken to prevent even greater damage. Such a malfunction can be caused, for example, by a defect or incorrect positioning of the inlet camshaft position sensor, of the outlet camshaft position sensor or of the crankshaft position sensor, as well as by a defect or a malfunction of a phase adjuster of the inlet camshaft or of the outlet camshaft. Of course, in such a case, initially a plurality of measurements can be performed successively in order to confirm the detected malfunction, and therefore to debounce the detection of a malfunction, and to take measures, such as for example an emergency operating mode or even deactivation of the internal combustion engine, when the result is unambiguously confirmed.

In some embodiments, compensating control correction measures Ktr_Mβn for controlling the internal combustion engine 1 and/or a fault message Info_Sig are brought about by means of a control unit 50 of the internal combustion engine 1 as long as the first and/or the second valve drive deviation values VT_Aww_1, VT_Aww_2 have been evaluated as plausible and do not exceed a predefined valve drive deviation limiting value, VT_Aww_Gw. This is illustrated symbolically in FIG. 3 by the sequence steps 302, 304, 305 and 308. For example, the correction measures Ktr_Mβn here can relate, inter alia, to the adaptation of the inlet camshaft adjustment angle ENVW and of the outlet camshaft adjustment angle ANVW by means of the phase adjuster, and to the adaptation of the ignition time, of the start of injection and of the injection quantity.

However, if the first and/or the second valve drive deviation values VT_Aww_1, VT_Aww_2 exceed a predefined valve drive deviation limiting value VT_Aww_Gw or a malfunction VT_Ffkt has already previously been detected in the region of the valve drive, an emergency operating mode Nt_Btb or an emergency stop Nt_stop and/or a fault message Info_Sig of the internal combustion engine 1 is brought about by means of a control unit 50 of the internal combustion engine 1. In this way, it is possible to react to various conditions in a way which is respectively adapted to an optimum degree, in order to ensure optimum operation of the internal combustion engine 1. This sequence is illustrated symbolically in FIG. 3 on the basis of the sequence steps 302, 304, 306, 307 and 308. In FIG. 4, the checking of the valve drive deviation values VT_Aww_1, VT_Aww_2 or VT_Aww_X in relation to a valve drive deviation limiting value VT_Aww_Gw is also illustrated, wherein below the valve drive deviation limiting value VT_Aww_Gw correction measures Ktr_Mβn are initiated and above the valve drive deviation limiting value VT_Aww_Gw an emergency operating mode Nt_Btb or an emergency stop Nt_Stop is initiated.

In some embodiments, the first and/or the second valve drive deviation values VT_Aww_1, VT_Aww_2 are acquired continuously during the operation of the internal combustion engine, and a respective deviation profile of the first and/or of the second valve drive deviation values VT_Aww_1, VT_Aww_2 is produced over time, as is also illustrated in FIG. 4. However, in this context, the focus is no longer on a result at a specific time but rather specific causes of the deviations in the valve drive are detected on the basis of the respective deviation profile. A typical example of this is the profile VT_Aww_X shown in FIG. 4, in which the profile makes it possible to detect a tooth jump. In this way, specific malfunctions can be advantageously identified and they can be a reaction thereto in an appropriate way during operation or the type of malfunction is recorded in a fault memory and can be used for diagnostic purposes during repair.

In this way, when there is a continuously rising value of the deviation profile a wear-induced cause of the deviation in the valve drive can be detected, which cause corresponds, depending on the embodiment of the valve drive, to lengthening of the chain, lengthening of a toothed belt or to wear of a gear wheel, and when there is a suddenly rising value of the deviation profile it is also possible to detect a tooth-jump-induced cause of the deviation in the valve drive. Furthermore, the example methods permit the magnitude of the deviation in the valve drive, that is to say, for example, a value for the lengthening of a chain, to be determined on the basis of the magnitude of a current deviation value of the valve drive.

If a valve drive has phase adjusters, a respective current phase adjustment value can, of course, also be included in the acquisition of the first deviation value of the valve drive. In this case, the possibility also arises of acquiring a deviation difference, between a current valve drive deviation value VT_Aww_E acquired on the basis of the inlet valve stroke phase difference ΔEVH and a further current valve drive deviation value VT_Aww_A acquired on the basis of the outlet valve stroke phase difference ΔAVH, and a defect in one of the phase adjusters is detected if the difference between the two valve drive deviation values exceeds a stipulated limiting value.

In some embodiments, the example method may be, if appropriate, implemented with the inclusion of all the embodiments and developments described above, on an electronic computer unit 53 which is assigned to an electronic programmable engine control unit 50 of the internal combustion engine 1 and is functionally connected thereto.

What is claimed is:

1. A method for detecting deviations occurring in a valve drive of an internal combustion engine, the method comprising:

measuring dynamic pressure oscillations of intake air in an air intake tract of the internal combustion engine during operation;

calculating an inlet valve stroke phase difference and/or an outlet valve stroke phase difference based on the measured dynamic pressure oscillation;

calculating a valve stroke phase deviation value with respect to a valve stroke phase reference value based on the calculated inlet valve stroke phase difference and/or outlet valve stroke phase difference;

noting a first valve drive deviation value equivalent to valve stroke phase deviation value; and based on the first valve drive deviation value, implementing one or more correction measures chosen from the group consisting of: adjusting an inlet camshaft adjustment angle, adjusting an outlet camshaft adjustment angle, adjusting an ignition timing, adjusting an injection quantity and starting an emergency operating mode and initiating an emergency stop of the internal combustion engine.

2. The method as claimed in claim 1, further comprising:

measuring an inlet camshaft angle difference and/or an outlet camshaft angle difference using a crankshaft position sensor and an inlet camshaft position sensor and/or outlet camshaft position sensor during operation;

calculating a second valve drive deviation value based on the measured inlet camshaft angle difference and/or outlet camshaft angle difference;

comparing the first and the second valve drive deviation value with one another to perform a reciprocal plausibility check; and calculating a valve drive deviation comparison value.

3. The method as claimed in claim 2, wherein the first and/or the second valve drive deviation value is identified as plausible only if the valve drive deviation comparison value does not exceed a predefined valve drive deviation limit.

4. The method as claimed in claim 3, wherein:

a control unit initiates control correction measures for the internal combustion engine and/or a fault message if the first and/or the second valve drive deviation values has been evaluated as plausible and does not exceed a predefined valve drive deviation limiting value; and the control unit initiates an emergency operating mode, emergency stop, and/or a fault message if the first and/or the second valve drive deviation value has been evaluated as plausible and exceeds the predefined valve drive deviation limiting value or a malfunction has already been previously detected associated with the valve drive.

5. The method as claimed in claim 4, further comprising continuously acquiring the first and/or the second valve drive deviation values during the operation of the internal combustion engine; and producing a respective deviation profile of the first and/or of the second valve drive deviation value over time, wherein specific causes of the deviations in the valve drive are detected based on the respective deviation profile.

6. The method as claimed in claim 3, further comprising, when there is a continuously rising value of the deviation, a wear-induced cause of the deviation in the valve drive is identified, which cause corresponds to at least one of: a lengthening of a chain, lengthening of a toothed belt, and/or wear of a gear wheel, and when there is a suddenly rising value of the deviation, a tooth-jump-induced cause of the deviation in the valve drive is identified.

7. The method as claimed in claim 2, further comprising identifying a malfunction during operation of the valve drive if the valve drive deviation comparison value exceeds a stipulated valve drive deviation comparison limiting value.

8. The method as claimed in claim 1, further comprising:

in order to acquire the inlet valve stroke phase difference and/or the outlet valve stroke phase difference of the internal combustion engine during operation, generating a corresponding pressure oscillation signal based on the measured dynamic pressure oscillations;

acquiring a crankshaft phase angle signal simultaneously with the measured dynamic pressure oscillations;

calculating a phase position and/or amplitude of a selected signal frequency of the measured dynamic pressure oscillations in relation to the crankshaft phase angle signal based on the pressure oscillation signal using discrete Fourier transformation;

acquiring, based on the acquired phase position and/or amplitude of the respective selected signal frequency, in each case as a function of lines of an equal phase position and/or of equal amplitude of the selected signal frequency, the lines depending on the inlet valve stroke phase difference and the outlet valve stroke phase difference, using reference lines of the equal phase position and/or of the equal amplitude of the same-signal frequency;

calculating a respective common intersection point of lines of the equal phase position and/or equal amplitude; and determining the inlet valve stroke phase difference and/or the outlet valve stroke phase difference based on the acquired common intersection point.

9. The method as claimed in claim 1, wherein the method is executed on an electronic computing unit assigned to an electronic, programmable engine control unit of the internal combustion engine.

10. An electronic, programmable engine control unit for controlling an internal combustion engine, the engine control unit comprising:

a processor; and an electronic memory unit storing a set of instructions, the instructions, when loaded and executed by the processor, causing the processor to:

measure dynamic pressure oscillations of intake air in an air intake tract of the internal combustion engine during operation;

calculate an inlet valve stroke phase difference and/or an outlet valve stroke phase difference based on the measured dynamic pressure oscillation;

calculate a valve stroke phase deviation value with respect to a valve stroke phase reference value based on the calculated inlet valve stroke phase difference and/or the calculated outlet valve stroke difference;

note a first valve drive deviation value equivalent to the valve stroke phase deviation value; and based on the first valve drive deviation value, implementing one or more correction measures chosen from the group consisting of: adjusting an inlet camshaft adjustment angle, adjusting an outlet camshaft adjustment angle, adjusting an ignition timing, adjusting an injection quantity and starting an emergency operating mode and initiating an emergency stop of the internal combustion engine.

* * * * *